July 5, 1960
R. A. WITTREN
2,943,500
HYDRAULIC CONTROL SYSTEM
Filed Feb. 18, 1958
4 Sheets-Sheet 1
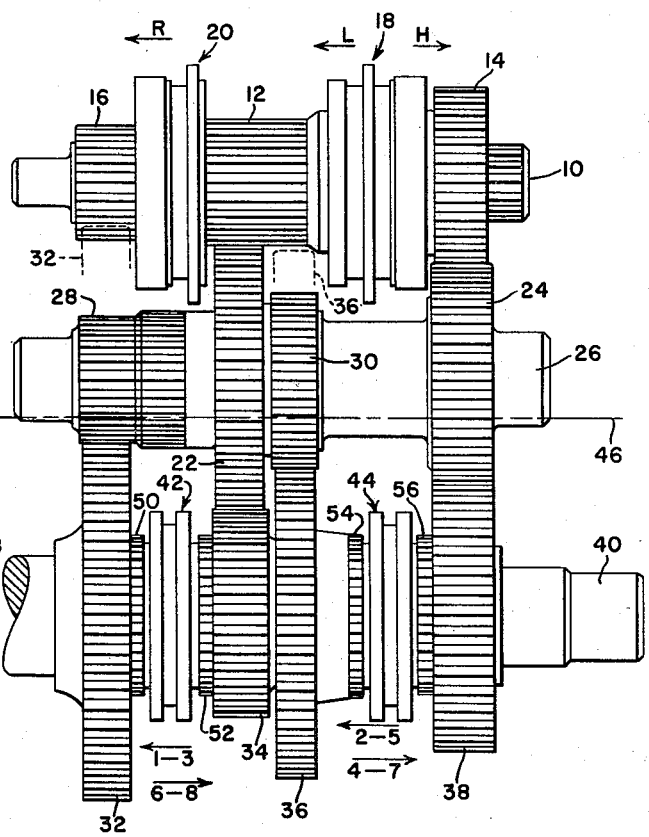
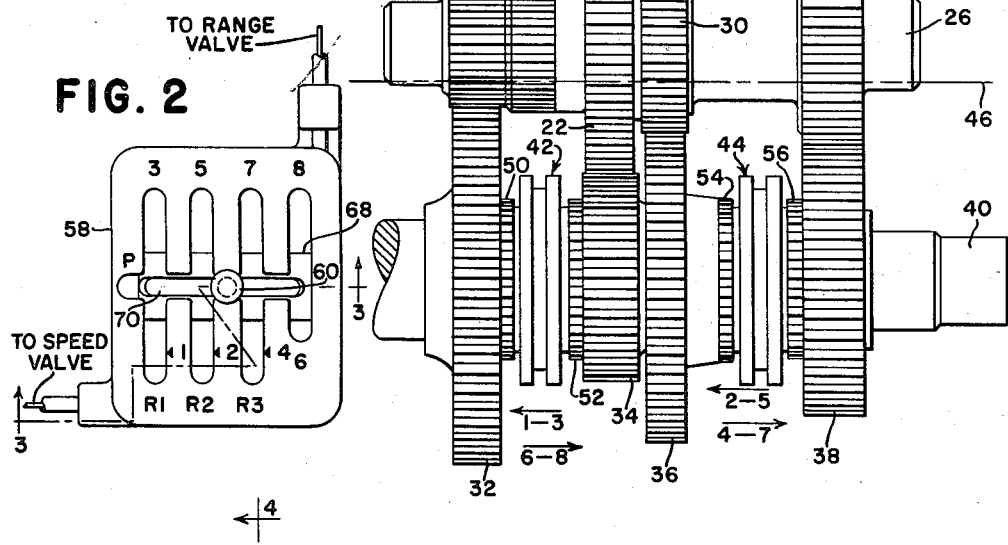
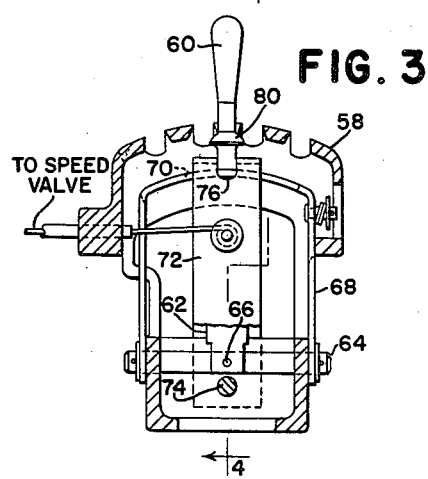
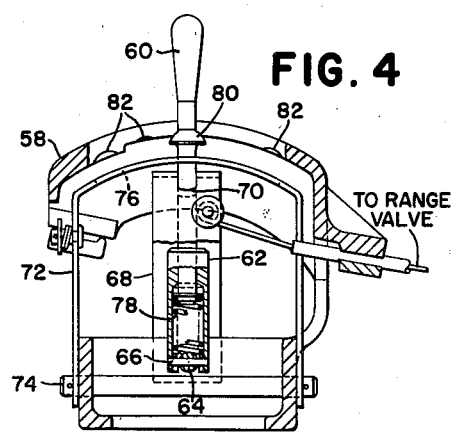
INVENTOR.
R. A. WITTREN

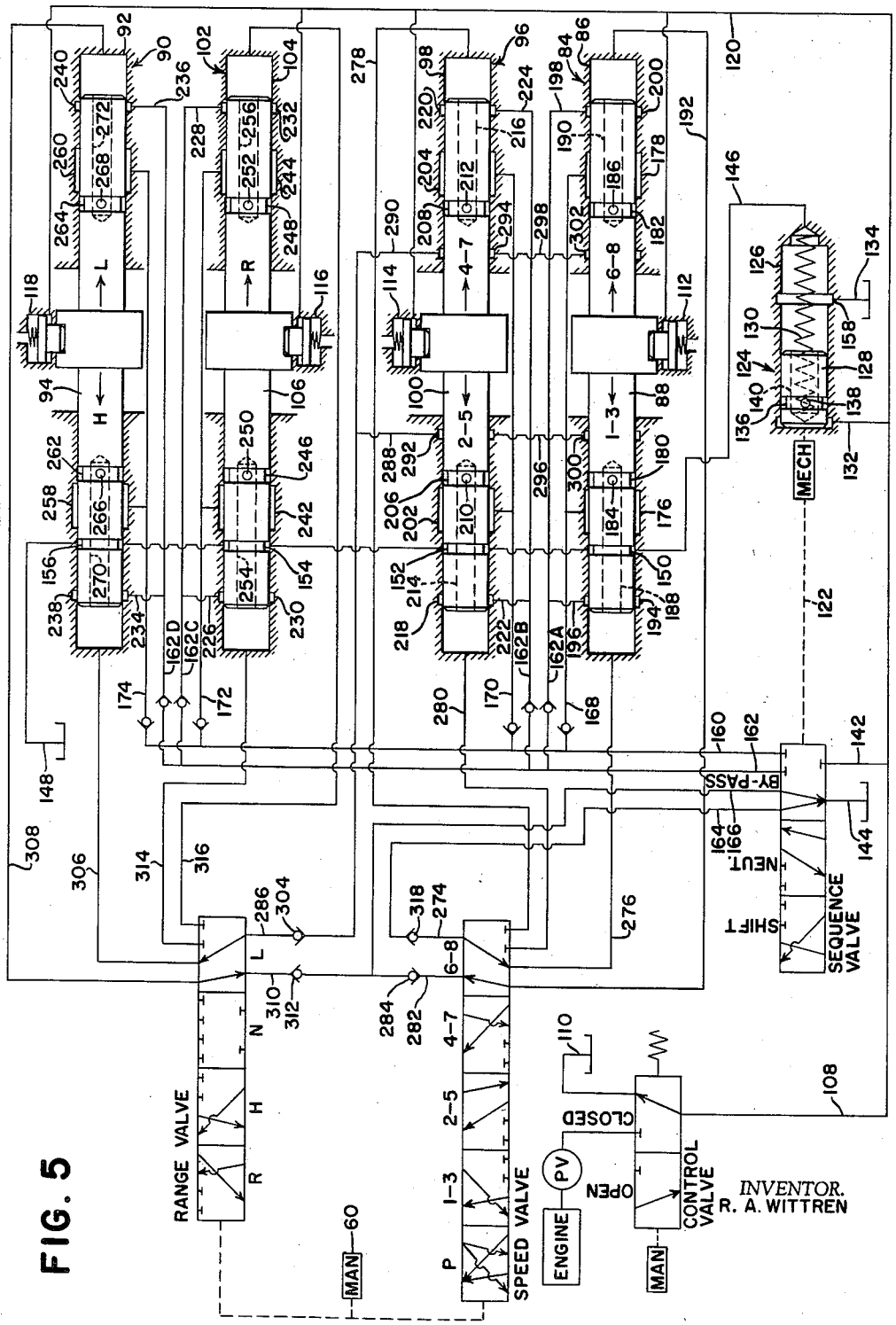

INVENTOR.
R. A. WITTREN

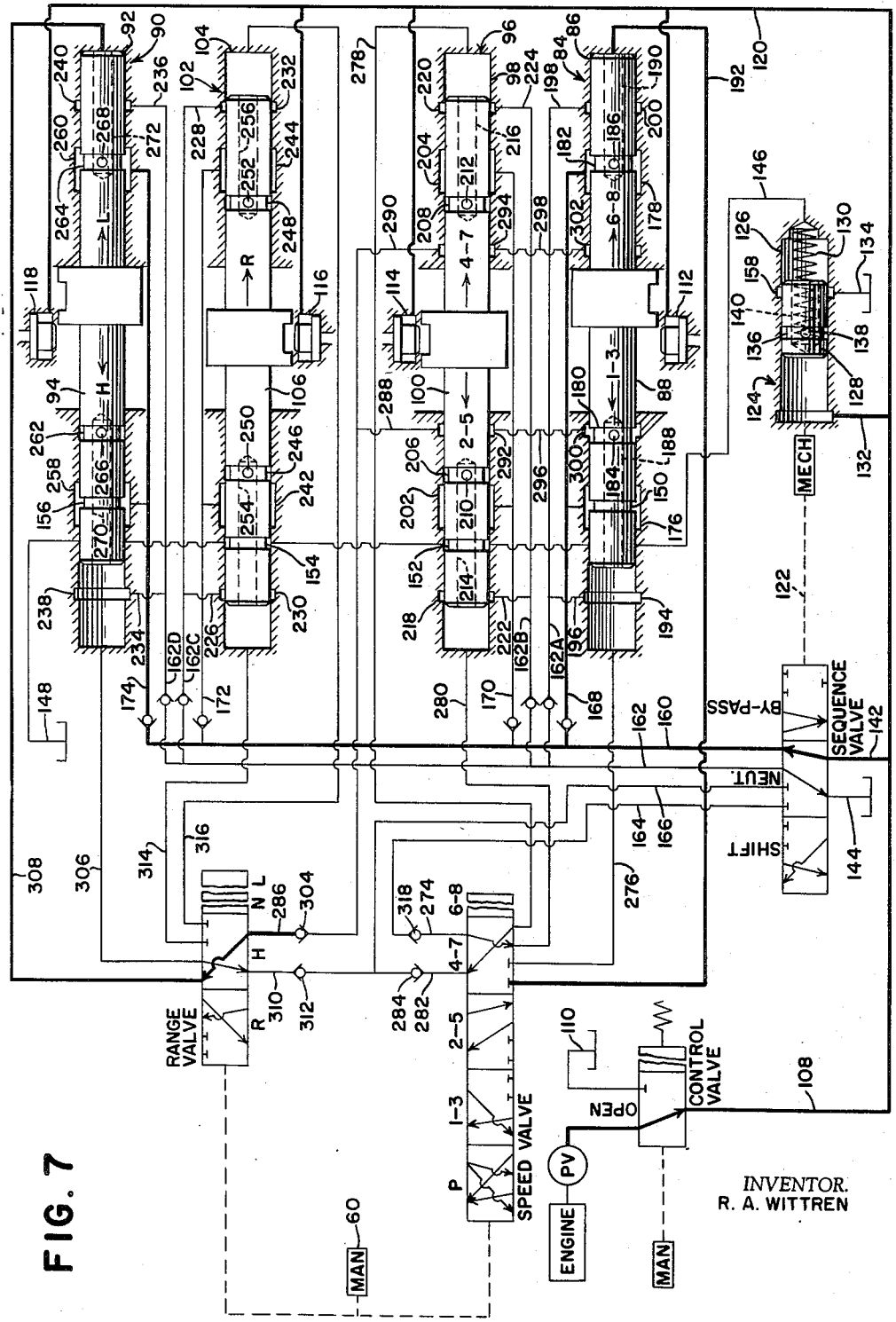

United States Patent Office 2,943,500
Patented July 5, 1960

2,943,500
HYDRAULIC CONTROL SYSTEM

Richard A. Wittren, Waterloo, Iowa, assignor, by mesne assignments, to Deere & Company, a corporation of Delaware Filed Feb. 18, 1958, Ser. No. 715,961
15 Claims. (Cl. 74—334)

This invention relates to a hydraulic control system and more particularly to such system as applied to the shifting of a vehicle transmission.

The invention finds significant utility in a transmission of the multi-speed dual-range type, a characteristic of which is the doubling of speed ratios by a provision of a high-low range section. The range section also includes reverse gearing whereby the undoubled number of speed ratios may be obtained in reverse, subject of course, to ratio variations introduced by the reverse gearing.

Because of the relatively large number of speeds obtainable, it is desirable that power shifting be afforded for a transmission of this character, and the type and nature of the power shifting will be affected somewhat by the particular design of the transmission and the shiftable elements therein. Among the factors affecting the design of the power shifting system will be the presence or absence of synchronizers, the shift distances, the sequence of shifting, etc.

An important feature of the present invention is the provision of a novel and improved fluid-pressure-operated power shifting system, particularly one in which the speed ratio is first selected and then the range ratio (as between high and low) is selected. This sequence applies also to reverse speeds. The sequencing arrangement between speed change and range change shifters insures proper distribution of synchronizing loads when synchronizers are used, and likewise facilitates shifting of gearing when synchronizers are not used. Still further, some of the foregoing benefits will be achieved in a transmission in which the range section only is equipped with synchronizers. It is a further object of the invention to arrange the system so that the several components of the transmission will attain neutral positions between engaged positions, thus eliminating the need for interlocks between the shiftable components. The invention has for a still further object the provision of hydraulically operated detents for maintaining the shiftable components in their different positions. In addition, the system introduces hydraulic locks for securing these positions, particularly the neutral positions intermediate shifted position. Other objects of the invention reside in improved means for securing sequential neutralizing and then shifting of the pistons in the gear-shifting motors, means for venting or draining the several motors so that emergency manual shifting of the gears may be obtained, hydraulically operated means for shifting a sequence valve among a venting or bypass position, a neutralizing position and a shift position, the latter two positions respectively incurring pressurizing of a neutralizing circuit and a shifting circuit.

The foregoing and other important objects and desirable features inherent in and encompassed by the invention will become apparent as a preferred embodiment of the invention is disclosed, by way of example, in the ensuing specification and accompanyiny sheets of drawings, the several figures of which are described below.

Fig. 1 illustrates a typical multi-speed dual-range transmission to which the power shifting system may be applied.

Fig. 2 is a plan of a manually operated selector and shift pattern therefor for controlling the selector valves for the range and speed sections.

Fig. 3 is a section as seen generally along the line 3—3 of Fig. 2.

Fig. 4 is a section as seen substantially along the line 4—4 of Fig. 3.

Fig. 5 is a schematic view, partly in section, of the shift system, showing all shift motors in neutral and showing the selector valves in pre-selected positions in which the range valve is in "low" and the speed valve is in its "6—8" position.

Fig. 7 is a similar view showing an intermediate stage in the shift from the position of Fig. 6 to one in which the range motor ultimately is shifted to its "high" position and another speed motor will attain an active position while the shifted motor of Fig. 6 will be returned to neutral.

Figure 6:
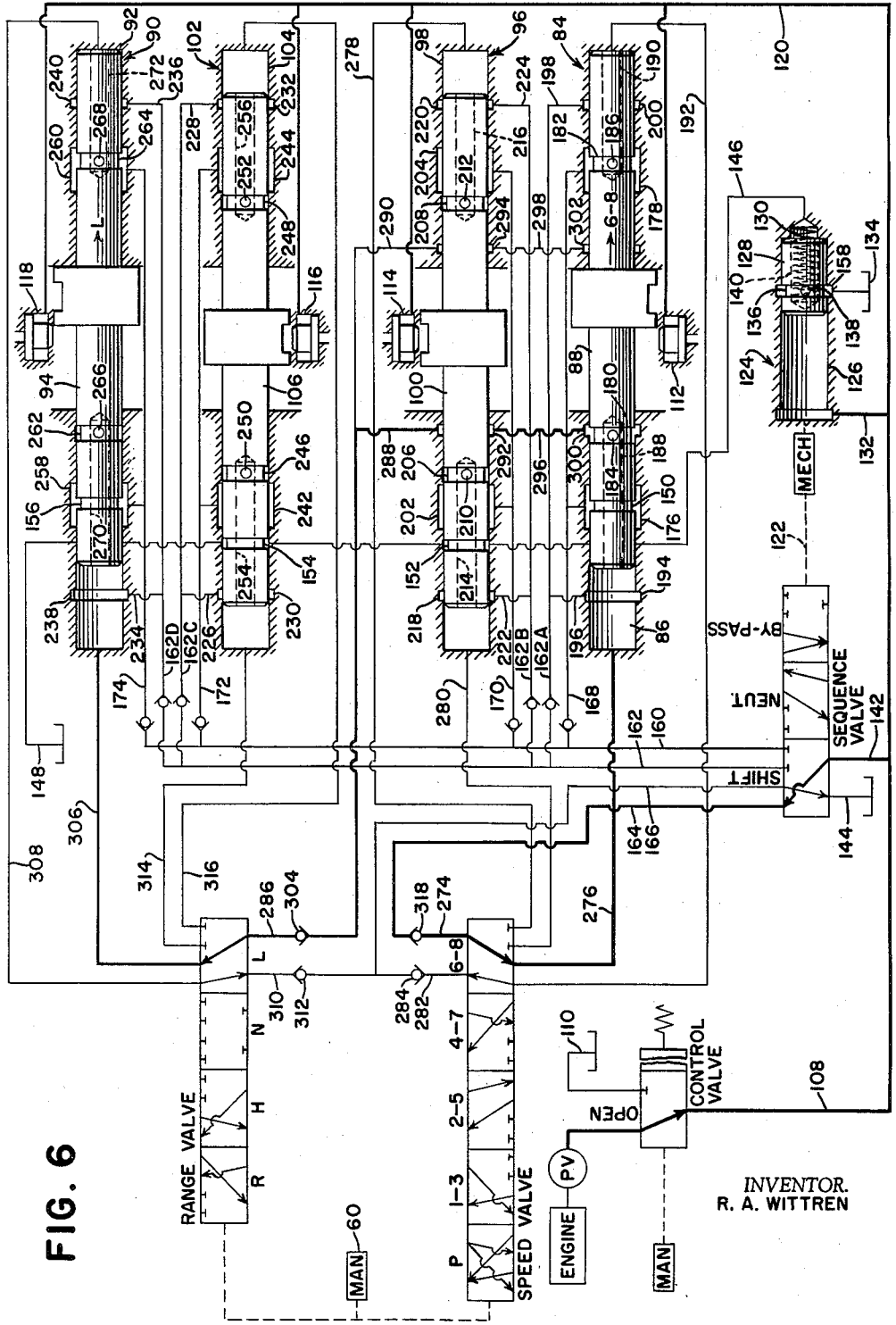
Fig. 6 is a similar view showing the achievement of the transition of the range motor to its "low" position and the speed motor to its "6—8" position.

The transmission chosen for the purposes of illustration (Fig. 1) is substantially identical to that forming the subject matter of the U.S. Patent to Du Shane 2,710,-546. In the present disclosure, superfluous supports and bearings have been omitted in the interests of simplicity.

This transmission includes an input shaft 10 on which are journaled a low range pinion 12, a high range pinion 14 and a reverse pinion 16. A bi-directionally shiftable clutch 18, which preferably incorporates a synchronizer of any conventional construction, includes an internal component keyed to the input shaft 10 and an outer component shiftable to the right, in the direction of the arrow "H" or to the left, in the direction of the arrow "L" for respectively connecting the pinions 14 or 12 to the input shaft. The element 18 has a central neutral position, in which it is shown. The reverse pinion 16 is selectively connectible to the input shaft 10 by a similar clutch element 20, which also preferably includes a synchronizer. This element is shown in its neutral position and is shiftable to the left, in the direction of the arrow "R," for engagement of reverse drive.

The low and high range pinions 12 and 14 are respectively in constant mesh with countershaft gears 22 and 24 which are keyed or otherwise fixed to a countershaft 26. In addition to the gears 22 and 24, the countershaft has fixed thereto gears 28 and 30. From the description thus far, it will be seen that when the synchronizer or clutch 18 is shifted to the left to its "low" position, the countershaft 26 will be driven via 12—22. When the clutch or synchronizer 18 is shifted to its "high" position, the countershaft will rotate at a higher rate of speed via 14—24.

The countershaft gears 28, 22, 30 and 26 are respectively in constant mesh with output gears 32, 34, 36 and 38, all of which are loose on an output shaft 40. Clutches 42 and 44, which may be like the clutch 18, are operative selectively to connect the output shaft to any one of the output shaft gears just described.

For the purposes of clarity in the illustration, the output shaft 40 is shown as displaced from its true position, and its true position is indicated by the broken line 46. Hence, as shown in broken lines, the output shaft gear 32 is in constant mesh with the reverse pinion 16 as well as being in constant mesh with the countershaft gear 28. Therefore, when the reverse clutch element 20 is shifted to its "reverse" position, the direction of rotation of the countershaft 26 is reversed, which affords four reverse speeds for the transmission, depending upon the direction of shifting of the clutches 42 or 44.

The input shaft and its clutches 18 and 20, together with the low, high and reverse pinions, 12, 14 and 16, may be said to constitute the range section of the transmission, whereas the output shaft 40 and its gears may be said to constitute the speed section. Hence, the clutches 18 and 20 are range clutches and the clutches 42 and 44 are speed clutches. The various speed ratios obtainable will be described immediately below.

Let it be assumed that the clutch element 18 is shifted to the left, or to its "low" position so that the low range pinion 12 is connected directly to the input shaft 10. The pinion 12 will now drive the countershaft 26 at a speed determined by the ratio between the pinion 12 and the countershaft gear 22, and the countershaft gear 22 will drive the output shaft gear 34 at a speed determined by the ratio therebetween. Since all countershaft gears are keyed to the countershaft, the other output shaft gears 32, 36 and 38 will be driven at speeds corresponding to the respective ratios between those gears and the countershaft gears 28, 30 and 24. As long as the speed clutches 42 and 44 are in neutral positions as shown, the output shaft 40 will not be driven. However, if the speed clutch 42 is shifted to the left, it will engage clutch teeth 50 on the gear 32 and will establish first speed forward. Similar teeth 52 are provided on the output shaft gear 34 for engagement by the clutch 42 when shifted to the right, which will produce sixth speed forward. During shifting of the speed clutch 42, with the range clutch 18 in "low," the other clutches 20 and 44, are, of course, in neutral.

Assuming that the range clutch 18 is still in "low," and the other clutches are in neutral, second speed may be obtained by shifting the clutch 44 to the left for engagement with teeth 54 on the output shaft gear 36. Fourth speed forward is obtained by shifting clutch 44 to the right to engage teeth 56 on the output gear 38. Thus, there are four speeds forward available in the low range.

Four speeds forward in the high range are also available, which is achieved by shifting the range clutch 18 to its "high" position, whereby the high speed input shaft pinion 14 is coupled directly to the input shaft and therefore drives the countershaft 26 at a speed determined by the ratio between the pinion 14 and countershaft gear 24. Again, the speed clutches 42 and 44 are used for achieving the four speeds forward in a higher range. For example, the clutch 42, when shifted to the left, produces third speed forward and when shifted to the right produces eighth speed forward. The clutch 44 when shifted to the left produces fifth speed forward and when shifted to the right produces seventh speed forward. Thus, the number of speeds available on the output shaft is doubled by the range clutch 18 and low and high range pinions 12 and 14.

Four speeds in reverse may be obtained by neutralizing the range clutch 18 and shifting the reverse clutch 20 to the left to couple the reverse pinion 16 to the input shaft 10. Since the reverse pinion 16 is in constant mesh with the output shaft gear 32, that gear will turn oppositely to the input shaft, and since the gear 32 is also in constant mesh with the countershaft gear 28, the countershaft 26 will rotate in the same direction as the output shaft, or in a reverse direction as respects its direction in low or high. First speed in reverse is then achieved by shifting the speed clutch 42 to the left to engage the teeth 50 on the output shaft gear 32. Second speed in reverse is obtained by shifting the clutch 44 to the left to engage the teeth 54 on the output shaft gear 36, the speed ratio of which is determined by the ratio between the gears or pinions 16—28—30—36. Third speed in reverse is obtained by shifting the speed clutch 44 to the right to engage the teeth 56 on the output shaft gear 38. Fourth speed in reverse is obtained by shifting the speed clutch 42 to the right to engage the teeth 52 on the gear 34. In the present embodiment of the invention, this fourth speed in reverse is found to be too high and the selector of Figs. 2, 3 and 4 is designed so that the operator cannot select that speed. However, this is a phase concerned only with a particular environment and is immaterial as respects the scope of the invention.

In the foregoing description, it has been assumed, or at least stated as being preferred, that the clutches 18, 20, 42 and 44 incorporate synchronizers. In the above mentioned Du Shane patent, synchronizers are used only in the clutches corresponding to those here at 18 and 20. In some instances, synchronizers may be dispensed with entirely. In any event, experience has shown that sequence of shifting should be selection of a speed ratio and then selection of a range ratio, since this more adequately distributes the shift or synchronizing load. According to the foregoing principle, the hydraulic system shown in Figs. 5, 6 and 7 is based on that preferred sequence. The mechanical selector shown in Figs. 2, 3 and 4 is also designed with that principle in mind.

The selector just described is operative to achieve the range and speed changes previously discussed in connection with Fig. 1 and illustrated thereon by appropriate arrows and identifying legends. This selector comprises a basic housing 58 and a selector lever 60 movable through a pattern best illustrated in Fig. 2 in which the various slots are identified by numerals according to the eight speeds forward and the three speeds in reverse. If fourth speed in reverse were desired, the 6—8 slot could be elongated on the order of the other slots. The lever 60 is carried at its lower end by a tubular member 62 pivoted on a cross shaft 64 for fore-and-aft movement in the plurality of slots and pivoted on a pin 66 for transverse movement through the single cross slot in the shift pattern. A yoke 68 is pivoted coaxially on the shaft 64 and has therein a transverse slot 70 through which the selector lever 60 extends for free lateral shifting to select one or the other of the several fore-and-aft slots. A second yoke 72 is pivoted on a fore-and-aft shaft 74 for lateral rocking and has therein a fore-and-aft slot 76 through which the selector lever 60 extends for fore-and-aft shifting after it has become aligned with one of the fore-and-aft slots. The arrangement is such that the selector lever is movable freely in the slot of one yoke while it moves the other yoke. Hence, as the lever 60 is moved laterally or from left to right as seen in Figs. 2 and 3, it will rock the yoke 72 about its pivot 74 but because it travels in the slot 70 of the yoke 68 it will not disturb the position of the yoke 68. However, after the lever has become aligned with one of the fore-and-aft slots, it may be moved in that slot in either a forward or a rearward direction to rock the yoke 68 while traveling in the slot 76 of the yoke 72. The arrangement is such that a speed ratio is first selected and then a range selection follows. For example, if the lever 60 is moved completely to the left as seen in Figs. 2 and 3, it will become aligned with the slot 3–R1. In this phase of movement, it will cause engagement of the speed clutch 42 with the clutch teeth 50 on the output shaft gear 32, but the transmission will not be established, because a range selection has not been made. The range selection as among first and third speeds forward and first speed in reverse is effected by movement of the lever 60 to the desired position. If third speed forward is desired, the lever 60 is moved to the forward end of the slot, the end marked "3." This will produce in the range section of the transmission the higher of the two ranges. In other words, it will select the higher of the two speeds available by the prior engagement of clutch 42 with the teeth 50 on the output shaft gear 32. If the lever 60 is moved part way to the rear and in transverse alignment with the numeral 1, the lower of the two speed ratios will be obtained, since the range section will be operating in low. Movement of the lever 60 all the way to the rear, to the end of the slot marked "R1" will produce first speed in reverse, the range clutch 18 having been in the meantime returned to neutral, as will hereinafter appear.

For the purpose of facilitating retention of the lever 60 in any selected position, it is spring loaded at 78 to effect a detent action at any position by an enlargement 80 which engages with appropriate notches, such as at 82, beneath the top of the selector housing 58 and corresponding to the several selector positions.

The mechanical or manual selector means just described is merely typical of many that could be used with the hydraulic system about to be elaborated. Accordingly, the hydraulic control system is not to be construed as being limited to any particular manual selector system. As will be described below, the hydraulic system includes selector valves, hereinafter identified as range and speed valves, which are mechanically connected to the selector system as by flexible cables. These are identified in Figs. 2, 3 and 4 by appropriate legends and need not be further described.

The ensuing description will deal primarily with Figs. 5, 6 and 7. In these figures, certain parts are identified by appropriate descriptive legends and therefore reference numerals will not be additionally applied.

The shift system comprises essentially a first motor 84 comprising a cylinder 86 and a piston 88. This piston is mechanically connected by any suitable means not material here to the speed-change clutch 42 and is therefore sometimes referred to herein as the 1–3, 6–8 motor, since it is shiftable to active positions respectively at opposite sides of a neutral position to condition the transmission to produce, selectively, first, third, sixth or eighth speeds forward. The choice in either case, as between first and third and as between sixth and eighth, is made by the range clutch 18, which is activated by a second motor 90 which comprises a cylinder 92 and a piston 94 shiftable to active positions respectively at opposite sides of a neutral position. The neutral positions of the pistons 88 and 94 are shown in Fig. 5. It will thus be seen that the motor 90 is effective to achieve the low, high and neutral positions of the range clutch 18 and, considered in conjunction with the first motor 84 is a second motor for effectuating the choice between first and third and sixth and eighth speeds forward. For example, and noting the legends and arrows applied to the piston in the mtoor 84, shifting of the piston to the left or in the 1–3 direction, will shift the speed clutch 42 also in the 1–3 direction, conditioning the output shaft to produce either first or third speed forward. When the range motor 90 is next energized, the piston 94 therein, when shifted to the left, will shift the range clutch 18 to the right (the mechanical connections are reversed), thus establishing the high range ratio in the transmission and driving the output shaft 40 at third speed forward. In other words, the range motor selects, in the circumstances just noted, the higher of the two speeds as between first and third. First speed forward, the lower of the two speeds just referred to, is selected by shifting of the range clutch 18 to the left by shifting of the range motor piston 94 to the right.

In view of the fact that the transmission, as already described, produces eight speeds forward and as many as four in reverse if desired, additional motors are provided for the speed clutch 44 and the reverse clutch 20. The 2–5, 4–7 motor for the clutch 44 is identified in its entirety by the numeral 96 and comprises a cylinder 98 and a piston 100. The reverse motor for the clutch 20 is designated in its entirety by the numeral 102, and comprises a cylinder 104 and a piston 106. The 2–5, 4–7 motor is shiftable in the same directions, respectively, as the speed clutch 44. As in the case of the range motor 90, the mechanical connections between the reverse motor piston 106 and the reverse clutch 20 are reversed so that the reverse clutch is shifted to the left by shifting of the reverse motor piston 106 to the right.

Control of the several motors just described is effectuated by a pair of selector valves, one being a speed valve for controlling the motors 84 and 96, and the other being a range valve for controlling the motors 90 and 102. These are manually connected to the manual selector means of Figs. 2, 3 and 4 by the flexible cables, for example, as already described and identified. The rectangle in each of the schematic view identified by the numeral 60 to represent the manual selector means.

As will be seen, the speed valve has 5 positions, one each for the 1–3, 2–5, 4–7, and 6–8 phase, plus a "park" position, identified by the letter P. The range valve has 4 positions; namely, reverse, high, neutral and low, identified by R, H, N, and L respectively.

The system is pressurized in the first instance by a pump, here a variable displacement pump PV, which may be driven in any suitable manner from the vehicle engine, for example, as illustrated. This pump is adapted to deliver to a high pressure input line 108, and the connection between the pump and this line is regulated by a control valve which may be manually operated between open and closed positions as indicated. In a typical example, the control valve can be connected to the vehicle clutch pedal, for example, so that depression of the clutch pedal to disengage the engine clutch opens the valve and pressurizes the input line 108. It is during this period that the shift phases are accomplished, so that when the clutch pedal is released to re-engage the engine clutch, the selected range and speed ratios will be effected in the transmission. The control valve may be biased to its closed position as shown. When the control valve is in its closed position, the input line is drained to reservoir as at 110.

Fig. 5 illustrates all the motor pistons in their respective neutral positions, in which they are respectively retained by hydraulically operated releasable means 112, 114, 116 and 118 respectively. These means are simultaneously pressurizable in parallel by what may be referred to as a detent pressure line 120 which is connected to the pressure input line 108. When the line 108 is pressurized, so is the line 120 and all detents are withdrawn to free the motor pistons for shifting from their neutral positions. Each detent or locking means is biased to its piston-locking position to lock its respective piston in either of its active positions, as well as in its neutral position. When the control valve is closed, as shown in Fig. 5, the detent line 120, being connected to the input line 108, is drained to reservoir at 110.

Except for the detent line 120, the circuit system for the shift arrangement is initially under control of a sequence valve appropriately identified, which is mechanically connected at 122, for example, to a sequence valve actuator 124. This actuator comprises a cylinder or bore 126 and a piston 128 biased to a closed position by a spring 130. The front or left hand face of the piston 128 is receivable of fluid pressure from the high pressure input line 108 by an actuator line 132, which forces the piston 128 to the right. This, operating through the mechanical connection 122, selects one of the three positions of the sequence valve, which three positions are identified as "shift," "neutral" and "by-pass." The sequence valve normally occupies its by-pass position, to which it is urged by the spring 130 behind the piston 128. The bore or chamber behind the piston 128 is drained to reservoir at 134, and the piston has a groove 136, one or more radial passages 138 and an axial passage 140 opening to its rear face to accommodate leakage past the piston, which leakage may drain to the reservoir at 134.

The sequence valve is instrumental in connecting the input line 108 to the range and speed valves and for this purpose controls an input line branch 142. In the by-pass position of the sequence valve, a connection is made to reservoir at 144.

The rear end of the cylinder or bore 126 of the sequence valve actuator 124 is additionally connected to reservoir by a reservoir line 146 which drains to reservoir at 148. This line 146 is under control of the pistons of the several motors and the arrangement is such that, when all motors are in their respective neutral positions, the line 146 is open to 148. When any motor is out of its neutral position, this line is blocked. This, as will hereinafter appear, controls the amount of movement that the piston 128 may make to the right from its Fig. 5 position, because when any one of the motors has its piston out of neutral, fluid will be trapped in the rear of the cylinder 126 and in the line 146 to limit the amount of movement of the piston 128 to the right. For this purpose, the pistons respectively have thereon valve means 150, 152, 154 and 156. As best seen in Fig. 5, all valve means are opened so that the line 146 is connected to the reservoir 148. Fig. 7, for example, shows that the piston 88 of the 1—3, 6—8 motor, which is in its 6—8 position, blocks the line 146 and thus effects the entrapment of fluid for limiting movement of the piston 128 of the actuator 124 to an intermediate position which achieves the neutral position of the sequence valve. It will also be seen in Fig. 7 that when the piston 128 of the sequence valve actuator occupies its intermediate position, the rear portion of the piston blocks a groove 158 to the drain 134, so that fluid trapped behind the piston cannot escape to the reservoir at 134 and is therefore trapped in the effective line portion 146. Also, in Fig. 7, the high-low motor piston 94 is out of its neutral position and the line 146 is additionally blocked because of the non-coincidence of the valve means 156.

Another thing to be noted in connection with the sequence valve and the sequence valve actuator is that movement of the actuator piston 128 is not identical but is proportional to movement of the sequence valve. This is accommodated by suitable motion-multiplying means in the mechanical connection 122, the details of which are not significant here.

The circuit to the several motors and to the speed and range valves involves four basic lines controlled by the sequence valve. These will hereinafter be referred to as a neutralizing line 160, a neutralizing drain line 162, a shift line 164 and a shift line drain 166.

When the sequence valve is in its by-pass position, the control valve is in its closed position. The shift line 164 and the shift line drain 166 are both connected to reservoir. The input line branch 142 and the neutralizing line 160 and the neutralizing line drain 162 are blocked. Since the control valve is in its neutral position, the input line 108 is not pressurized and therefore the detents 112, 114, 116 and 188 are locked and the sequence valve actuator piston 128 is in its leftward position corresponding to the by-pass position of the sequence valve. Hence, the system is idle and no shifting will occur irrespective of the positions of the speed and range valves.

The neutralizing line 160 has motor branches 168, 170, 172 and 174. In the case of the 1—3, 6—8 motor the branch 168 leads to annular grooves 176 and 178 in the motor cylinder 86. When the piston 88 of this motor is in its neutral position, as shown in Fig. 5, the grooves 176 and 178 are respectively out of axial register with piston grooves 180 and 182. The piston grooves lead respectively via radial passages 184 and 186 to axial passages or bores 188 and 190 which open respectively at opposite ends of the cylinder. Hence, even if the neutralizing line is pressurized, it will have no effect on the motor piston 88, since that piston is already in its neutral postion. However, if the piston 88 is out of its neutral position, as in Fig. 7, pressurizing of the neutralizing line will act through the branch 168 and cylinder groove 178 to supply fluid to the right hand end of the piston, via the piston groove 182, radial passage 186 and axial passage 190, pushing against the right hand end of the motor piston 88 to move it to the left and back to its neutral position. A motor line 192 that leads from the right hand end of the cylinder 86 back to the speed valve is blocked at the speed valve so that neutralizing pressure cannot escape thereby. Fluid trapped in the cylinder 86 at the left hand end of the piston 88 is exhausted via a cylinder groove 194 and drain branch 196 which connects to the neutralizing drain line 162. As shown in Fig. 7, the neutral position of the sequence valve connects the neutralizing drain line 162 to the reservoir at 144. The neutralizing line 162 includes an additional branch connection 198 to a cylinder groove 200 at the other end of the piston for accommodating neutralizing line drain when the piston 88 is shifted from a leftward position back to a neutral position. It will be noted in Fig. 7 that the reservoir line valve 150 registers with the cylinder groove 176 but, since the groove 150 is not radially perforated, no fluid transmission can occur. Another thing that should be noted is that as the piston 88 moves back to its neutral position, the left hand end of the piston gradually cuts off the drain groove 194 so that when the piston exactly attains its neutral position, no escape of fluid can occur from the left hand end of the cylinder 86, thus ascertaining the exact neutral position of the piston. Of course this occurs only when the control valve is open, which is shown in Fig. 7, and the detent 112 will of course be lifted to permit movement of the piston. The neutral position of the sequence valve, as shown, enables pressurizing of the neutralizing circuit, particularly the neutralizing line 160, to achieve the return to neutral just described.

The neutralizing line branch 170 is connected to cylinder grooves 202 and 204 in the cylinder for the 2—5, 4—7 motor 96, and these grooves, when the motor piston 100 is in its neutral position, are axially out of register respectively with piston grooves 206 and 208, hence cutting off fluid transmission respectively to opposite ends of the piston via radial bores 210 and 212 and axial passages 214 and 216. Cylinder drain grooves 218 and 220 at opposite ends of the motor are connected to the neutralizing drain line 162 by branch connections 222 and 224. These branches 222 and 224 are connected to a main neutralizing drain branch 162B, just as the drains 196 and 198 of the motor 84 are connected to a branch 162A that leads to the neutralizing line 162. The neutralizing of the piston 100 follows that described above in connection with the neutralizing of the piston 88.

A third branch 162C is connected at 226 and 228 respectively to cylinder grooves 230 and 232 for the reverse motor 102, and a fourth neutralizing line drain branch 162D is connected at 234 and 236 respectively to cylinder grooves 238 and 240 at opposite ends of the high-low motor 90.

The neutralizing line pressure branch 172 is connected to opposite ends of the reverse motor 102 via annular cylinder grooves 242 and 244 which, when the piston 106 is in its neutral position as shown in Fig. 5, are respectively out of axial register with piston grooves 246 and 248. The piston is radially perforated respectively at 250 and 252 for communication with axial passages 254 and 256, which are like the passages 188 and 190 in the piston 88. Similarly, the fourth neutralizing line branch 174 is connected to the motor 90 by cylinder grooves 258 and 260 which are similarly related to piston grooves 262 and 264 for controlling the transmission of fluid to radial passages 266 and 268 and axial passages 270 and 272, respectively.

Suitable one-way or non-return ball checks are used in the neutralizing line and drain branches for obvious purposes and need not be elaborated.

The shift line 164 leads to one side of the speed valve at 274, and the position of the valve will determine which side of which of the motors 84 and 96 will be supplied with pressure.

As already described, the motor 84 has the motor line 192 connected to the right hand end thereof and leading to the speed valve. A second motor line 276 is connected to the left hand end of the motor 84 and leads also to the speed valve. Motor lines 278 and 280 lead respectively from the right and left hand ends of the motor 96 to the speed valve. In the case of each motor, the motor lines are alternately serviceable as pressure and return lines, depending upon the direction of movement of the motor. For example, when it is desired to shift the motor piston 88 to the right or to the 6—8 position, the speed valve assumes its 6—8 position as shown in Fig. 5 and pressure is transmitted across the valve from 274 to 276 to the left hand end of the piston 88. Fluid exhausted from the right hand end of the piston travels via the line 192 back to the speed valve, exiting at 282 past a ball check 284 to the shift drain 166. When the sequence valve is in its shift position (Fig. 6) it will be seen that the shift drain 166 is connected to the reservoir 144 across the sequence valve. Similar results are obtained as to the 2—5, 4—7 motor 96 when the speed valve is in its 2—5 or 4—7 position, the latter of which is illustrated in Fig. 7. The shifting of the transmission in detail will be covered below.

It is a feature of the invention that the range selection is deferred until the speed selection is achieved. For this purpose, each of the motors 84 and 96 controls a connector valve means to effectuate pressure to the range valve after the selected speed motor has accomplished its speed change. For this purpose, fluid pressure is supplied to one side of the range valve at 286 and this line is connected at 288 and 290 to cylinder grooves 292 and 294 respectively at opposite sides of the central portion of the piston 100. The grooves 292 and 294 are connected respectively by lines 296 and 298 to grooves 300 and 302 respectively at opposite sides of a mid-portion of the piston 88. Since the grooves 292, 294, 300, and 302 are annular, they are always in communication via the lines 296 and 298 and therefore are always conditioned to supply fluid to the line 286 past a non-return check valve 304. As best seen in Fig. 5, where all pistons are in neutral, the range line 286 is cut off from fluid pressure via any source. However, as seen in Fig. 6, wherein the 1—3, 6—8 motor is shifted to its 6—8 position, the groove 180 in the piston 88 registers with the groove 300 and therefore supplies fluid under pressure via 296, 292, and 288 to the range line 286. The range valve, being in its low position, supplies fluid to the left hand end of the high-low motor piston 94 via a motor line 306, and fluid is returned from the opposite end of the high-low motor via a motor line 308 and across the range valve at 310 and past a non-return ball check 312 to the shift drain line 166. When the range motor 90 is shifted in the opposite direction, the functions of the motor lines 306 and 308 will be reversed; that is, the line 308 will be a pressure line and the line 306 will be a return line (Fig. 7). When the range valve is in its neutral position, the lines will carry no fluid under pressure. When the range valve is in its reverse position, motor lines 314 and 316, connected to opposite ends of the reverse motor 102, are alternately serviceable as pressure and return lines.

A non return ball check 318 is afforded in the shift line 164.

*Operation*

Both speed motors 84 and 96 and both range motors 90 and 102 are in their neutral positions in Fig. 5, as are the respective clutches 42, 44, 18 and 20. The range valve has been shown in its "low" position, and the speed valve is shown in its 6—8 position. To achieve this position in Fig. 2, the selector lever 60 will have first been moved to the right to the 6—8 slot, which achieves the 6—8 position of the speed valve and then will be moved downwardly to the "6" end of the slot, which will achieve the "low" position of the range valve.

It will be assumed that the engine clutch is engaged, which means that the clutch pedal or whatever manual device operates the control valve is in an inactive position. Hence, the control valve will be closed and the subsequently pressurizible lines 120, 132, 142 and 108 will be connected across the closed control valve to reservoir at 110.

Having made the speed selection as just described, in which the speed valve is in its 6—8 position and the range valve is in its "low" position, the operator now depresses the clutch, or otherwise manipulates the control valve, to its opened position as shown in Fig. 6. The pump immediately pressurizes the line 108 and likewise the detent line 120, which lifts or disengages the several detents or locking devices 112, 114, 116 and 118. The line 132 to the sequence valve actuator 124 is also pressurized, causing the piston 128 to shift to the right. Since all motor pistons were in neutral (Fig. 5), the sequence valve reservoir line 146 was continuous to reservoir at 148. Consequently, no fluid could be trapped behind the sequence valve actuator piston 128, whereby that piston moves completely to the right (Fig. 6) and, by means of the mechanical connection 122, moves the sequence valve completely to the right to its shift position. The pressure line 142 is connected across the sequence valve in its shift position to the shift line 164, which leads to the speed valve at 274 past the ball check 318, and across the speed valve in its 6—8 position to the motor line 276. Fluid pressure at this point acts on the left hand end of the piston 88, shifting this piston to the 6—8 position to cause the clutch 42 to also shift to the right to engage the teeth 52 on the gear 34 so that the gear 34 is connected to the output shaft 40. As the piston 88 attains its 6—8 position (Fig. 6) the connector valve means constituted by the piston groove 180 and cylinder groove 300 becomes effective to supply the second shift line, or range line, via 188—184—180—300—296—292—288 and past the ball check 304 to 286; thence, across the range valve as indicated by the arrow for supplying the left hand end of the high-low motor piston 94, resulting in shifting of this piston to the right or to its "low" position, which shifts the range clutch 18 to the left or to its low position. The transmission is now operating in sixth speed forward as determined by the speed ratios between the pinions and gears 12—22—34.

As the speed motor piston 88 shifts to the right as described, fluid from its right hand end is exhausted via the other motor line 192 and across the speed valve at 282, past the ball check 284 and thence to the shift line drain 166 and across the sequence valve to the reservoir 144. Fluid exhausted from the right end of the high-low piston 94 follows the line 308 and across the range valve to 310 and past the ball check 312 to the drain 166.

As long as the control valve is open, the detent line 120 will be pressurized to lift the several detents, including those on the motors 96 and 102 wherein the pistons are not shifted. Nevertheless, as will be seen, the lines 278 and 280 from opposite ends of the piston 100 are blocked at the speed valve and this piston is therefore hydraulically locked. The same is true as respects the piston 106 of the motor 102, wherein the lines 314 and 316, which lead from opposite ends of the motor, are blocked at the range valve. As will be apparent from an examination of the system and an analysis of its operation, this result obtains in all cases.

As soon as the affected pistons attain their active positions and the transmission is mobilized for drive in the selected range and speed ratios, the control valve is closed. In the present instance, this entails also engagement of the engine clutch so that drive from the engine to the vehicle wheels, for example, is completed. As the control valve reaches its closed position, the input line 108 is then connected to reservoir at 110 (Fig. 5), and all the detents or locking devices 112, 114, 116 and 118 return to their locking positions. In the case of the detents 114 and 116, they again lock their respective pistons in their respective neutral positions. In the cases of the detents 112 and 118, the locking effect occurs on the respective pistons in their respective active positions. At the same time, the spring 130 behind the sequence valve actuator piston 128 returns that piston fully to the left to return the sequence valve to its by-pass position.

Fig. 7 illustrates a phase of operation in the shift from the sixth speed forward position of Fig. 6 to seventh speed forward. The description of Fig. 7 starts with the assumption that the pistons 88 and 94 are in the same positions as in Fig. 6. Since these pistons are in their active positions, both of them block the sequence valve actuator reservoir line 146. This results in a limit on the movement of the sequence valve actuator piston 128. Thus, when the control valve is opened and the lines 108 and 132 are pressurized, the piston 128 will move to the right, but will stop at the intermediate position shown in Fig. 7. As the sequence valve actuator piston 128 reaches the position of Fig. 7, its right hand end portion blocks the groove 158, so that the drain 134 is no longer effective. Since the line 146 is blocked by the active position of the piston 88, a certain amount of fluid is trapped in the line portion 146 between the sequence valve cylinder 126 and the solid portion of the piston 88. Therefore, the sequence valve stops in its neutral position, and thereby the pressure line 144 is connected across the sequence valve to the neutralizing pressure line 160. This leads via the branch 168 to the cylinder groove 178 for the motor 84 and, since the piston 88 is in its active position, the piston groove 182 is in axial register with this cylinder groove 178. Thus, fluid pressure is transmitted through the radial passage 186 and axial passage 190 against the right hand end wall of the cylinder 86, forcing the piston 88 to the left. Neutralizing line pressure cannot escape via the motor line 192, because this line is blocked at the speed valve in its 4—7 position, as will be seen in Fig. 7.

As the piston 88 moves to the left, its left hand end ultimately cuts off the cylinder groove 194, preventing further exhaust to the neutralizing drain 162 via 194—196—162A, and the piston will stop in its neutral position. As before, all the detents 112, 114, 116 and 118 have been lifted because the detent line 120 is pressurized in series with the input line 108.

The neutralizing line branch 174, being connected in parallel with the neutralizing line branch 168, will act on the piston 94 of the motor 90 simultaneously with neutralizing of the piston 88, and this piston will attain its neutral position also. Specifically, the branch 174 will supply the cylinder groove 260 and thence the piston groove 264, passage 268 and passage 272, to force the piston 94 to the left. The motor line 308 from the right hand end of the motor 90 cannot provide a path of escape for the pressure fluid, since even though it leads across the range valve in its high position, it is blocked at 286 by the ball check 304. Neutralizing exhaust from the left hand end of the piston 94 returns to reservoir via 238—234—162D—162 along with the exhaust from the left hand end of the speed motor piston 88.

In initially achieving the status of the range and speed valves in Fig. 7, the operator will first move the selector lever 60 (Fig. 2) to the 4—7 slot which will move the speed valve to its 4—7 position. He then moves the lever forward to the "7" end of the slot, which moves the range valve to its high position.

As the pistons 88 and 94 attain their neutral positions, the cutoff at 194 for the piston 88 and the cutoff at 238 for the piston 94 assure the neutral positions of these pistons, even though the detents are still pressurized. However, as these pistons attain their neutral positions, they again effectuate the line 146 to the reservoir 148, removing the trap behind the piston 128 of the actuator 124 so that the piston, still under pressure via 132, can move fully to its right hand position, acting through the mechanical connection 122 to move the sequence valve to its shift position. Again, as in Fig. 6, the pressure line 142 supplies the shift line 164 to the speed valve at 274, thence across that valve to the motor line 280 at the left hand end of the 2—5, 4—7 motor, whereupon this piston will be shifted to the right to shift the clutch 44 to the right. As this piston reaches its rightward active position, the groove 206 in the piston, which is supplied by the passages 214 and 210, registers with the second shift or range line portion 288 to thereby supply fluid to the range valve at 286, thence across that valve to the line 308 and thence to the right hand end of the now neutral high-low piston 94, forcing that piston to the left or to its high position to engage the clutch 18 with the input shaft pinion 14. The transmission then operates at a speed and range ratio determined by the pinion 14, countershaft gear 24 and output shaft gear 38. When the shift has occurred, the engine clutch is engaged, which entails closing of the control valve, and all detents 112, 114, 116, and 118 move to their locking positions, and the sequence valve moves again to its by-pass position.

On the basis of the foregoing, the shifting of the transmission to other forward speeds can be readily appreciated, as can shifting for obtaining the several reverse speeds, the details of which are believed to be sufficiently clear from what has been said as to require no elaboration.

One feature of importance is the by-pass position of the sequence valve (Fig. 5). In this position, both the shift line 164 and the shift line drain 166 are connected to the reservoir at 144. In the event of failure of the pump or some other defect in the hydraulic shifting system, any speed in the transmission may be obtained manually by forcing the desired pistons in the selected directions, after the selector lever has first set the speed and range valves in the selected positions. For example, looking now at Fig. 5 and assuming that it is desirable to shift the transmission to sixth speed forward manually rather than hydraulically, the necessary manual effort is exerted against the piston 88 to move it to the right. This will entail the forcing of fluid from the right hand end of the motor cylinder 86, but this fluid can escape by the line 192 across the speed valve in its 6—8 position past the ball check 284 and out the shift drain line 166 to the reservoir 144. The high-low piston 94 must also be shifted to the right, and fluid exhausted from the right hand end of the cylinder 92 will escape via the motor line 308, range valve, line 310 and past the ball check 312 to the shift drain 166. The shift line 164 is also connected to the reservoir at 144 and leads to the left hand end of the piston 88 via the lines 274 and 276, to relieve any suction that might exist. The same is true of the connection of the left hand end of the high-low motor piston 94, since, as the piston 88 attains its 6—8 position, the line 276 is connected to the line 296 via the valve means 180—184—300 and this line in turn is connected to the second shift or range line 286.

As will be seen from the foregoing description, a relatively simple hydraulic shifting arrangement has been provided for a transmission, particularly of the multi-speed dual-range type. Provision is made for locking the pistons mechanically in their several positions and provision is further made for establishing an interim hydraulic lock when the mechanical locking means or detents are released. A significant feature is the shifting of all pistons to their neutral positions between speed and ratio changes, which avoids the requirement of complicated interlocks between the shifters. In view of the sequence in which the speed ratio is selected first and the range ratio next, proper distribution of synchronizing and gear change loads is assured.

The park or "P" position of the speed valve is attained by shifting of the selector lever 60 completely to the left to the "P" notch in the selector lever housing 58. By reason of the mechanical connection between the selector lever and the speed valve, which is not material here, additional movement of the speed valve is obtained, and the portion of this valve is such that the clutch 42 is shifted to its 1—3 position simultaneously with shifting of the clutch 44 to its 4—7 position. This creates a gearing lockup between the countershaft and output shaft for immobilizing the transmission. The details of this arrangement form no part of the present invention and are disclosed in assignee's copending application Ser. No. 603,538, filed August 13, 1956, now patent No. 2,839,941.

Features of the present invention, in addition to those outlined above, will readily occur to those versed in the art, all of which may be achieved without departure from the spirit and scope of the invention.

What is claimed is:

1. A fluid-pressure control system for a transmission and the like, comprising: a pressure source; first and second fluid motors, each having a piston shiftable to either of two active positions at opposite sides of a neutral position; a neutralizing circuit connected to the motors and pressurizible to shift the pistons to their respective neutral positions; a pair of first motor lines connected to opposite ends of the first motor and alternately pressurizible to selectively shift the first motor piston to an active position; a first shift line; a first selector valve selectively settable in either of two positions to connect either first motor line to the shift line; a pressure input line; a control valve having open and closed positions to connect and disconnect the input line respectively to and from the pressure source; a sequence valve selectively settable in a neutral position to connect the input line exclusively to the neutralizing circuit for shifting both pistons to their neutral positions when the control valve is open and settable in a shift position, after both pistons attain their neutral positions, to connect the shift line to the input line exclusively of the neutralizing line for pressurizing the shift line and whichever motor line is selected by said first selector valve when the control valve is open; a second shift line; connector valve means operative when the first piston attains either active position for pressurizing said second shift line from the pressurized first motor line; a pair of second motor lines connected respectively to opposite ends of the second motor and selectively pressurizible to shift the second motor piston selectively to an active position; and a second selector valve settable in either of two positions to connect either second motor line to the second shift line.

2. The invention defined in claim 1, including: limit means operative to limit the sequence valve to its neutral position while either piston is out of its neutral position and thereafter to enable the sequence valve to achieve its shift position.

3. The invention defined in claim 1, including: first and second fluid-pressure-actuated piston-locking means respectively for the first and second motors and connected to the input line, said locking means being biased to lock the respective pistons against shifting when the control valve is closed and pressurizible to release the pistons when the control valve is open.

4. The invention defined in claim 1, including: a fluid-pressure-operated actuator connected to and for moving the sequence valve to its neutral and shift positions and connected to and pressurizible by the input line when the control valve is open.

5. The invention defined in claim 4, including: limit means operative to limit movement of the actuator to achievement of the neutral position of the sequence valve while either piston is out of its neutral position and operative thereafter to enable the actuator to achieve the shift position of the sequence valve.

6. The invention defined in claim 5, in which: the actuator includes a chamber having opposite ends and a piston movable in said chamber, one end of said chamber being connected to the input line for shifting said actuator piston in one direction; a reservoir line leading from the opposite end of the chamber; and valve means closing said reservoir line when either motor piston is in neutral so as to trap fluid in said chamber for limiting movement of the piston to a range corresponding to the neutral position of the sequence valve, said reservoir line valve means opening said reservoir line when both motor pistons reach their neutral positions to enable said actuator piston to move further for incurring the shift position of the sequence valve.

7. The invention defined in claim 6, including: a fluid drain line at said other end of the chamber; means on the actuator piston for blocking the drain line when said actuator piston incurs the neutral position of the sequence valve whereby trapped fluid is prevented from escaping via said drain line; and passage means in the actuator piston and leading to the drain for draining fluid pressure leakage past the actuator piston from the input line.

8. A fluid-pressure control system for a transmission and the like, comprising: a pressure source; first and second fluid motors, each having a piston shiftable to either of two active positions at opposite sides of a neutral position; a neutralizing circuit connected to the motors and pressurizible to shift the pistons to their respective neutral positions; a pair of first motor lines connected to opposite ends of the first motor and alternately pressurizible to selectively shift the first motor piston to an active position; a first shift line; a first selector valve selectively settable in either of two positions to connect either first motor line to the shift line; a sequence valve selectively settable in a neutral position to connect the pressure source exclusively to the neutralizing circuit for shifting both pistons to their neutral positions and settable in a shift position, after both pistons attain their neutral positions, to connect the shift line to the pressure source exclusively of the neutralizing line for pressurizing the shift line and whichever motor line is selected by said first selector valve; a second shift line; connector valve means operative when the first piston attains either active position for pressurizing said second shift line from the pressurized first motor line; a pair of second motor lines connected respectively to opposite ends of the second motor and selectively pressurizible to shift the second motor piston selectively to an active position; and a second selector valve settable in either of two positions to connect either second motor line to the second shift line.

9. The invention defined in claim 8, including: limit means operative to limit the sequence valve to its neutral position while either piston is out of its neutral position and thereafter to enable the sequence valve to achieve its shift position.

10. The invention defined in claim 8, including: first and second fluid-pressure-actuated piston-locking means respectively for the first and second motors and normally biased to lock the respective pistons against shifting; and means for selectively pressurizing and depressurizing said locking means.

11. The invention defined in claim 8, including: a fluid-pressure-operated actuator connected to and for moving the sequence valve to its neutral and shift positions and selectively connectible to and disconnectible from the pressure source.

12. The invention defined in claim 11, including: limit means operative to limit movement of the actuator to achievement of the neutral position of the sequence valve while either piston is out of its neutral position and operative thereafter to enable the actuator to achieve the shift position of the sequence valve.

13. The invention defined in claim 12, in which: the actuator includes a chamber having opposite ends and a piston movable in said chamber, one end of said chamber being connectible to the pressure source for shifting said actuator piston in one direction; a reservoir line leading from the opposite end of the chamber; and valve means closing said reservoir line when either motor piston is in neutral so as to trap fluid in said chamber for limiting movement of the piston to a range corresponding to the neutral position of the sequence valve, said reservoir line valve means opening said reservoir line when both motor pistons reach their neutral positions to enable said actuator piston to move further for incurring the shift position of the sequence valve.

14. A fluid-pressure control system for a transmission and the like, comprising: a pressure source, including a reservoir; first and second fluid motors, each having a piston shiftable to either of two active positions at opposite sides of a neutral position; a neutralizing circuit connected to the motors and pressurizible to shift the pistons to their respective neutral positions; a pair of first motor lines connected to opposite ends of the first motor and alternately pressurizible to selectively shift the first motor piston to an active position; a first shift line; a first selector valve selectively settable in either of two positions to connect either first motor line to the shift line; a sequence valve normally disposed in a by-pass position to connect both the first shift line and the neutralizing circuit to the reservoir and selectively settable in a neutral position to connect the pressure source exclusively to the neutralizing circuit for shifting both pistons to their neutral positions and settable in a shift position, after both pistons attain their neutral positions, to connect the shift line to the pressure source exclusively of the neutralizing line for pressurizing the shift line and whichever motor line is selected by said first selector valve; a second shift line; connector valve means operative when the first piston attains either active position for pressurizing said second shift line from the pressurized first motor line; a pair of second motor lines connected respectively to opposite ends of the second motor and selectively pressurizible to shift the second motor piston selectively to an active position; and a second selector valve settable in either of two positions to connect either second motor line to the second shift line.

15. The invention defined in claim 8, including: means for venting both the neutralizing circuit and the first shift line to reservoir to remove hydraulic lock from both motors.

No references cited.